(12) United States Patent
Zhang et al.

(10) Patent No.: US 9,560,347 B2
(45) Date of Patent: Jan. 31, 2017

(54) METHOD AND SYSTEM OF TRANSFORM BLOCK PROCESSING ACCORDING TO QUANTIZATION MATRIX IN VIDEO CODING

(75) Inventors: Ximin Zhang, San Jose, CA (US); Shan Liu, San Jose, CA (US)

(73) Assignee: HFI INNOVATION INC., Zhubei, Hsinchu (TW)

( * ) Notice: Subject to any disclaimer, the term of this patent is extended or adjusted under 35 U.S.C. 154(b) by 206 days.

(21) Appl. No.: 14/234,505

(22) PCT Filed: Aug. 21, 2012

(86) PCT No.: PCT/US2012/051770
§ 371 (c)(1),
(2), (4) Date: Jan. 23, 2014

(87) PCT Pub. No.: WO2013/032794
PCT Pub. Date: Mar. 7, 2013

(65) Prior Publication Data
US 2014/0177728 A1  Jun. 26, 2014

Related U.S. Application Data

(60) Provisional application No. 61/526,453, filed on Aug. 23, 2011, provisional application No. 61/596,350, filed on Feb. 8, 2012.

(51) Int. Cl.
*H04B 1/66* (2006.01)
*G06K 9/36* (2006.01)
(Continued)

(52) U.S. Cl.
CPC ...... *H04N 19/00084* (2013.01); *H04N 19/122* (2014.11); *H04N 19/126* (2014.11);
(Continued)

(58) Field of Classification Search
CPC .... H04N 19/61; H04N 19/176; H04N 19/124; H04N 19/18; H04N 19/172; H04N 19/59
See application file for complete search history.

(56) References Cited

U.S. PATENT DOCUMENTS 6,650,708 B1  11/2003  Ohgose
7,860,159 B2  12/2010  Shen et al.
(Continued)

FOREIGN PATENT DOCUMENTS

CN  101039421 A  9/2007
CN  101622881 A  1/2010
(Continued)

OTHER PUBLICATIONS

English language translation of abstract of JP H06284412 (published Oct. 7, 1994).
(Continued)

*Primary Examiner* — Dave Czekaj
*Assistant Examiner* — Alison Slater
(74) *Attorney, Agent, or Firm* — McClure, Qualey & Rodack, LLP

(57) ABSTRACT

A method and system process transform blocks according to quantization matrices in a video coding system. Embodiments of the present invention derive one or more derived quantization matrices from one or more initial quantization matrices or from one previously derived quantization matrix. In one embodiment, the initial quantization matrices include a 4×4 and 8×8 quantization matrices, which can be either default or user-defined. All quantization matrices larger than 8×8 can be derived from the 4×4 and 8×8 initial quantization matrices. Non-square quantization matrices can be derived from at least one initial square quantization matrix or at least one derived square quantization matrix. Individual initial quantization matrices may be used to
(Continued)

derive respective larger quantization matrices. Furthermore, the individual initial quantization matrices may be derived from larger quantization matrices designed for corresponding transform sizes. Syntax design also enables the quantization matrix representation.

30 Claims, 14 Drawing Sheets

(51) Int. Cl.
| | |
|---|---|
| H04N 19/122 | (2014.01) |
| H04N 19/124 | (2014.01) |
| H04N 19/115 | (2014.01) |
| H04N 7/26 | (2006.01) |
| H04N 11/02 | (2006.01) |
| G06K 9/32 | (2006.01) |
| H04N 19/196 | (2014.01) |
| H04N 19/176 | (2014.01) |
| H04N 19/70 | (2014.01) |
| H04N 19/60 | (2014.01) |
| H04N 19/126 | (2014.01) |
| H04N 19/18 | (2014.01) |
| H04N 19/80 | (2014.01) |

(52) U.S. Cl.
CPC .......... *H04N 19/176* (2014.11); *H04N 19/18* (2014.11); *H04N 19/197* (2014.11); *H04N 19/198* (2014.11); *H04N 19/60* (2014.11); *H04N 19/70* (2014.11); *H04N 19/80* (2014.11)

(56) References Cited

U.S. PATENT DOCUMENTS

| | | | | |
|---|---|---|---|---|
| 7,949,196 | B2 | 5/2011 | Bossen | |
| 8,891,887 | B2* | 11/2014 | Sato | H04N 19/115 382/232 |
| 9,071,817 | B2 | 6/2015 | Lu et al. | |
| 9,143,789 | B2* | 9/2015 | Zhou | H04N 19/117 |
| 2003/0026335 | A1 | 2/2003 | Thyagarajan | |
| 2003/0118243 | A1* | 6/2003 | Sezer | G06T 9/005 382/245 |
| 2006/0227866 | A1* | 10/2006 | Winger | H04N 19/176 375/240.03 |
| 2008/0192824 | A1 | 8/2008 | Lim et al. | |
| 2009/0201989 | A1* | 8/2009 | Ahmed | H04N 19/423 375/240.08 |
| 2009/0310677 | A1* | 12/2009 | Shiodera | H04N 19/70 375/240.15 |
| 2010/0086028 | A1* | 4/2010 | Tanizawa | H04N 19/176 375/240.12 |
| 2011/0158315 | A1* | 6/2011 | Kim | H04N 19/124 375/240.03 |
| 2014/0050267 | A1 | 2/2014 | Sakurai et al. | |
| 2014/0369620 | A1 | 12/2014 | Sato | |
| 2015/0063447 | A1 | 3/2015 | Tanaka | |

FOREIGN PATENT DOCUMENTS

| | | |
|---|---|---|
| CN | 101854526 A | 10/2010 |
| JP | H06284412 | 10/1994 |
| JP | H1188880 | 3/1999 |
| JP | 2001112000 | 4/2001 |
| JP | 2004254327 | 9/2004 |
| JP | 2012138883 | 7/2012 |
| JP | 2013038758 | 2/2013 |
| WO | WO 2012/108237 | 8/2012 |
| WO | WO 2012/160890 | 11/2012 |
| WO | WO 2013/008459 | 1/2013 |

OTHER PUBLICATIONS

English language translation of abstract of JP H1188880 (published Mar. 30, 1999).

English language translation of abstract JP 2001112000 (published Apr. 20, 2001).

English language translation of abstract of JP 2012138883 (published Jul. 19, 2012).

English language translation of abstract of JP 2013038758 (published Feb. 21, 2013).

Tanaka, J., et al.; "Quantization Matrix for HEVC;" Joint Collaborative Team on Video Coding (JCT-VC) of ITU-T SG16 WP3 and ISO/IEC JTC1/SC29/WG11; 5th Meeting; Mar. 2011; pp. 1-25.

Zhang, X., et al.; "Method and Syntax for Quantization Matrices Representation;" Joint Collaborative Team on Video Coding (JCT-VC) of ITU-T SG16 WP3 and ISO/IEC JTC1/SC29/WG11; 7th Meeting; Nov. 2011; pp. 1-9.

Zhou, M.; "Non-CE04 Carriage of Large Block Size Quantization Matrices with Up-Sampling;" Joint Collaborative Team on Video Coding (JCT-VC) of ITU-T SG16 WP3 and ISO/IEC JTC1/sc29/WG11; 7th Meeting; Nov. 2011; pp. 1-7.

Zhou, M.; "Compact Representation of Quantization Matrices for HEVC;" Joint Collaborative Team on Video Coding (JCT-VC) of ITU-T SG16 WP3 and ISO/IEC JTC1/sc29/WG11; 4th Meeting; Jan. 2011; pp. 1-10.

Sullivan, et al.: "Meeting report of the sixth meeting of the Joint Collaborative Team on Video Coding (JCT-VC)", Torino, IT, Jul. 14-22, 2011; pp. 1-183.

* cited by examiner

Fig. 1A

| 6 | 13 | 20 | 28 |
|---|---|---|---|
| 13 | 20 | 28 | 32 |
| 20 | 28 | 32 | 37 |
| 28 | 32 | 37 | 42 |

Fig. 1B

| 10 | 14 | 20 | 24 |
|---|---|---|---|
| 14 | 20 | 24 | 27 |
| 20 | 24 | 27 | 30 |
| 24 | 27 | 30 | 34 |

Fig. 1C

| 6 | 10 | 13 | 16 | 18 | 23 | 25 | 27 |
|---|---|---|---|---|---|---|---|
| 10 | 11 | 16 | 18 | 23 | 25 | 27 | 29 |
| 13 | 16 | 18 | 23 | 25 | 27 | 29 | 31 |
| 16 | 18 | 23 | 25 | 27 | 29 | 31 | 33 |
| 18 | 23 | 25 | 27 | 29 | 31 | 33 | 36 |
| 23 | 25 | 27 | 29 | 31 | 33 | 36 | 38 |
| 25 | 27 | 29 | 31 | 33 | 36 | 38 | 40 |
| 27 | 29 | 31 | 33 | 36 | 38 | 40 | 42 |

Fig. 1D

| 9 | 13 | 15 | 17 | 19 | 21 | 22 | 24 |
|---|---|---|---|---|---|---|---|
| 13 | 13 | 17 | 19 | 21 | 22 | 24 | 25 |
| 15 | 17 | 19 | 21 | 22 | 24 | 25 | 27 |
| 17 | 19 | 21 | 22 | 24 | 25 | 27 | 28 |
| 19 | 21 | 22 | 24 | 25 | 27 | 28 | 30 |
| 21 | 22 | 24 | 25 | 27 | 28 | 30 | 32 |
| 22 | 24 | 25 | 27 | 28 | 30 | 32 | 33 |
| 24 | 25 | 27 | 28 | 30 | 32 | 33 | 35 |

| 27 | 26 | 25 | 24 | 23 | 21 | 18 | 17 | 16 | 15 | 13 | 12 | 11 | 10 | 8  | 6  |
|----|----|----|----|----|----|----|----|----|----|----|----|----|----|----|----|
| 31 | 30 | 29 | 28 | 27 | 26 | 25 | 24 | 23 | 21 | 18 | 17 | 16 | 16 | 15 | 13 |
| 37 | 36 | 35 | 34 | 32 | 31 | 30 | 29 | 28 | 27 | 26 | 25 | 24 | 24 | 23 | 21 |
| 42 | 41 | 40 | 39 | 38 | 37 | 36 | 35 | 33 | 32 | 31 | 30 | 29 | 29 | 28 | 27 |

Fig. 4B

| 27 | 28 | 29 | 29 | 30 | 31 | 32 | 33 | 35 | 36 | 37 | 38 | 39 | 40 | 41 | 42 |
|----|----|----|----|----|----|----|----|----|----|----|----|----|----|----|----|
| 21 | 23 | 24 | 24 | 25 | 26 | 27 | 28 | 29 | 30 | 31 | 32 | 34 | 35 | 36 | 37 |
| 13 | 15 | 16 | 16 | 17 | 18 | 21 | 23 | 24 | 25 | 26 | 27 | 28 | 29 | 30 | 31 |
| 6  | 8  | 10 | 11 | 12 | 13 | 15 | 16 | 17 | 18 | 21 | 23 | 24 | 25 | 26 | 27 |

| | | | | | | | |
|---|---|---|---|---|---|---|---|
| 6  | 10 | 13 | 16 | 18 | 23 | 25 | 27 |
| 7  | 10 | 13 | 16 | 19 | 23 | 25 | 27 |
| 8  | 10 | 14 | 17 | 20 | 24 | 26 | 28 |
| 9  | 10 | 15 | 17 | 21 | 24 | 26 | 28 |
| 10 | 11 | 16 | 18 | 23 | 25 | 27 | 29 |
| 10 | 12 | 16 | 19 | 23 | 25 | 27 | 29 |
| 11 | 13 | 17 | 20 | 24 | 26 | 28 | 30 |
| 12 | 14 | 17 | 20 | 24 | 26 | 28 | 30 |
| 13 | 16 | 18 | 23 | 25 | 27 | 29 | 31 |
| 13 | 16 | 19 | 23 | 25 | 27 | 29 | 31 |
| 14 | 17 | 20 | 24 | 26 | 28 | 30 | 32 |
| 15 | 17 | 21 | 24 | 26 | 28 | 30 | 32 |
| 16 | 18 | 23 | 25 | 27 | 29 | 31 | 33 |
| 16 | 19 | 23 | 25 | 27 | 29 | 31 | 33 |
| 17 | 20 | 24 | 26 | 28 | 30 | 32 | 34 |
| 17 | 21 | 24 | 26 | 28 | 30 | 32 | 34 |
| 18 | 23 | 25 | 27 | 29 | 31 | 33 | 36 |
| 18 | 23 | 25 | 27 | 29 | 31 | 33 | 36 |
| 19 | 23 | 25 | 27 | 29 | 31 | 34 | 36 |
| 19 | 23 | 25 | 27 | 29 | 31 | 34 | 36 |
| 20 | 23 | 25 | 27 | 29 | 31 | 34 | 36 |
| 21 | 24 | 26 | 28 | 30 | 32 | 35 | 37 |
| 22 | 24 | 26 | 28 | 30 | 32 | 35 | 37 |
| 23 | 25 | 27 | 29 | 31 | 33 | 36 | 38 |
| 23 | 25 | 27 | 29 | 31 | 33 | 36 | 38 |
| 24 | 26 | 28 | 30 | 32 | 34 | 37 | 39 |
| 24 | 26 | 28 | 30 | 32 | 34 | 37 | 39 |
| 25 | 27 | 29 | 31 | 33 | 36 | 38 | 40 |
| 25 | 27 | 29 | 31 | 33 | 36 | 38 | 40 |
| 26 | 28 | 30 | 32 | 34 | 37 | 39 | 41 |
| 26 | 28 | 30 | 32 | 34 | 37 | 39 | 41 |
| 27 | 29 | 31 | 33 | 36 | 38 | 40 | 42 |

Fig. 5

| | Descriptor |
|---|---|
| seq_parameter_set_rbsp( ) { | |
| ... | |
| seq_quant_matrix_present_flag | u(1) |
| if( seq_quant_matrix_present_flag ) | |
| for( quant_matrix_id = 0; quant_matrix_id < 36; quant_matrix_id++ ) { | |
| seq_quant_matrix_present_idx[quant_matrix_id] | u(1) |
| if(seq_quant_matrix_present_idx[quant_matrix_id]) { | |
| if(quant_matrix_id<12) { | |
| quant_matrix_coding(quant_matrix_id) | |
| }else{ | |
| implicit_quant_matrix_present_idx[quant_matrix_id] | u(1) |
| if(implicit_quant_matrix_present_idx[quant_matrix_id]) { | |
| quant_matrix_derivation(quant_matrix_id) | |
| }else{ | |
| quant_matrix_coding(quant_matrix_id) | |
| } | |
| } | |
| } | |
| ... | |
| rbsp_trailing_bits( ) | |
| } | |

*Fig. 8*

| | Descriptor |
|---|---|
| pic_parameter_set_rbsp( ) { | |
| pic_parameter_set_id | ue(v) |
| seq_parameter_set_id | ue(v) |
| ...... | |
| pic_quant_matrix_present_flag | u(1) |
| if( pic_quant_matrix_present_flag ) | |
| scaling_list_param( ) | |
| ...... | |
| rbsp_trailing_bits( ) | |
| } | |

*Fig. 9*

| aps_rbsp( ) { | Descriptor |
|---|---|
| aps_id | ue(v) |
| ...... | |
| if( pic_quant_matrix_present_flag ) | |
| scaling_list_param( ) | |
| ...... | |
| rbsp_trailing_bits( ) | |
| } | |

*Fig. 10*

| | Descriptor |
|---|---|
| scaling_list_param( ) { | |
|   for( SizeID = 0; SizeID < 4; SizeID++ ) | |
|     for( MatrixID = 0; MatrixID < (SizeID = = 3) ? 2 : 6; MatrixID++ ) { | |
|       scaling_list_pred_mode_flag | u(1) |
|       if( !scaling_list_pred_mode_flag ) | |
|         scaling_list_pred_matrix_id_delta | ue(v) |
|       else | |
|         scaling_list( ScalingList[ SizeID ][ MatrixID ][ 0 ], ( 1 << ( 4 + ( sizeID << 1 ) ) ) ) | |
|       If(SizeID>1){ | |
|         upsample_scaling_list(ScalingList[ SizeID ][ MatrixID ][ 0 ], SizeID) | |
|       } | |
|     } | |
| } | |

Fig. 11

| | Descriptor |
|---|---|
| upsample_scaling_list( ScalingList, SizeID ) { | |
|   memcpy( temporary_list, ScalingList, 64); | |
|   k= (SizeID -1); height=width=16*k; | |
|   step= 1<<k; | |
|   for( i=0; i < height, i+=step ) { | |
|     for(j=0;j<width; j+=step){ | |
|       for(m=0;m<step; m++){ | |
|         for(n=0;n<step; n++){ | |
|           ScalingList[i+m][j+n]= temporary_list[i>>k][j>>k]; | |
|         } | |
|       } | |
|     } | |
|   } | |
| } | |

*Fig. 12*

METHOD AND SYSTEM OF TRANSFORM BLOCK PROCESSING ACCORDING TO QUANTIZATION MATRIX IN VIDEO CODING

CROSS REFERENCE TO RELATED APPLICATIONS

The present invention claims priority to U.S. Provisional Patent Application, Ser. No. 61/526,453, filed Aug. 23, 2011, entitled "Quantization matrix representation for video coding in HEVC" and U.S. Provisional Patent Application, Ser. No. 61/596,350, filed Feb. 8, 2012, entitled "Quantization matrix representation for video coding in HEVC". The U.S. Provisional Patent Applications are hereby incorporated by reference in their entireties.

FIELD OF THE INVENTION

The present invention relates to video coding. In particular, the present invention relates to transform block processing according to quantization matrix.

BACKGROUND

Quantization matrix has been utilized in various video coding standards, such as MEPG2 and H.264/AVC to improve the subjective video quality. Each of transform coefficients is quantized according to an individual quantization step as specified by the quantization matrix (or scaling matrix). Due to its effectiveness, the quantization matrix has also been adopted by the emerging High Efficiency Video Coding (HEVC) system. The quantization matrix usually has the same dimension as the transform used by the system. For example, in MEPG2 and H.264/AVC, the transform sizes include 8×8 and 4×4. Therefore, the sizes of quantization matrix also support 4×4 and 8×8. Default quantization matrices as well as user-defined quantization matrices are used in H.264/AVC. Furthermore, separate quantization matrices are selected for Intra mode and Inter mode in H.264/AVC. The quantization matrices for Intra 4×4, Inter 4×4, Intra 8×8 and Inter 8×8 are shown in FIGS. 1A-D respectively. The encoder can decide whether the current picture will use a flat quantization matrix, default quantization matrix or user defined quantization matrix. If a user-defined quantization matrix is selected, information associated with the quantization matrix has to be incorporated in the bitstream so that the decoder can recover the corresponding quantization matrix.

In MEPG2 and H.264/AVC, the maximum size of quantization matrix is 8×8. The memory requirement for storing default quantization matrix is relatively small and it won't pose any significant issue to the coding system. When a user defined quantization matrix is used, the data size associated with the user defined quantization matrix is not a big issue either. Nevertheless, in HEVC, more transform sizes have been adopted and the transform size can be as large as 32×32. For example, to store two (Intra and Inter) 4×4 default quantization matrices and two 8×8 default quantization matrices only require 160 bytes. Using the same way to store two 32×32 default quantization matrices alone will require 2048 bytes. The total storage requirements of quantization matrices for MPEG2/H264/AVC and HEVC are shown in Table 1 and Table 2 respectively. As shown in the tables, the data size requirement for the quantization matrices in HEVC is increased substantially (more than 18 times). For high-speed hardware-based implementation, the quantization matrices may be hardwired and the data size associated with the quantization matrices will have significant impact on the device. Therefore, it is very desirable to develop a new quantization matrix representation scheme that can reduce the data size required to store the quantization matrices. When user-defined quantization matrices are used, large quantization matrices may consume sizeable precious bitrate. Therefore, it is also desirable to develop a new quantization matrix representation scheme that can reduce the data rate for transmitting the user-defined quantization matrices.

TABLE 1

| Matrix size | Num of values | PU Type | Component | Memory Size (byte) |
|---|---|---|---|---|
| 4 × 4 | 16 | Intra/Inter | Y/Cb/Cr | 96 |
| 8 × 8 | 64 | Intra/Inter | Y | 128 |
| Total | | | | 224 |

TABLE 2

| Matrix size | Num of values | PU Type | Component | Memory Size (byte) |
|---|---|---|---|---|
| 4 × 4 | 16 | Intra/Inter | Y/Cb/Cr | 96 |
| 8 × 8 | 64 | Intra/Inter | Y/Cb/Cr | 384 |
| 16 × 16 | 256 | Intra/Inter | Y/Cb/Cr | 1536 |
| 32 × 32 | 1024 | Intra/Inter | Y | 2048 |
| Total | | | | 4064 (1814%) |

BRIEF SUMMARY OF THE INVENTION

A method and system for processing transform blocks according to quantization matrices in a video coding system is disclosed. Embodiments of the present invention derive one or more derived quantization matrices from one or more initial quantization matrices or from one previously derived quantization matrix. In one embodiment, the initial quantization matrices include a 4×4 and 8×8 quantization matrices, which can be either default or user-defined. In another embodiment, all quantization matrices larger than 8×8 are derived from the 4×4 and 8×8 initial quantization matrices. In yet another embodiment, all rectangular quantization matrices are derived from the 4×4 and 8×8 initial quantization matrices.

One aspect of the present invention addresses the method to convert an initial quantization matrix to a derived quantization matrix. A smaller square initial quantization matrix can be converted to a larger square derived quantization matrix by either spatial frequency up-sampling and linear interpolation, or spatial frequency up-sampling and sample repetition. Alternatively, the conversion can be achieved by mapping the smaller square initial quantization matrix to low-frequency entries of the larger square derived quantization matrix by aligning an entry corresponding to a lowest spatial frequency of both quantization matrices.

One aspect of the present invention addresses deriving the initial quantization matrix having a square size. The initial quantization matrix can be derived from a larger square initial quantization matrix, where the larger initial quantization matrix is not stored or transmitted. The derivation can be performed according to spatial frequency decimation. Alternatively, the derivation can be performed by mapping low-frequency entries of the larger square initial quantization matrices to the square initial quantization matrices with an entry corresponding to a lowest spatial frequency of both quantization matrices aligned.

One aspect of the present invention addresses syntax design to enable quantization matrix representation. A flag can be incorporated in a sequence level to indicate whether default quantization matrices are used for a respective sequence. A flag can also be incorporated in an adaptation level or picture level to indicate whether sequence-level quantization matrices are used for a current picture. Syntax information can be incorporated in the video bitstream to indicate that all quantization matrices with sizes bigger than 8×8 are derived from initial quantization matrices. Also, syntax information can be incorporated in the video bitstream to indicate that all rectangular quantization matrices are derived from initial quantization matrices.

BRIEF DESCRIPTION OF THE DRAWINGS

FIGS. 1A-D illustrate quantization matrices used in AVC for Intra 4×4, Inter 4×4, Intra 8×8 and Inter 8×8 respectively.

FIGS. 3A-B illustrate an example of converting a derive 16×16 quantization matrix to a 32×32 quantization matrix by spatial frequency up-sampling and linear interpolation.

FIGS. 4A-C illustrate an example of deriving 4×16 and 16×4 quantization matrices from a 16×16 quantization matrix.

FIG. 5 illustrates an example of deriving a 32×8 quantization matrix from the 32×32 quantization matrix in FIG. 3A-B.

FIG. 8 illustrates an exemplary syntax design for SPS for HEVC to enable quantization matrix representation according to the present invention.

FIG. 9 illustrates an exemplary syntax design for PPS for HEVC to enable quantization matrix representation according to the present invention.

FIG. 10 illustrates an exemplary syntax design for APS for HEVC to enable quantization matrix representation according to the present invention.

FIG. 11 illustrates an exemplary implementation of the "scaling_list_param( )" function.

FIG. 12 illustrates an exemplary syntax design for deriving rectangular or larger quantization matrices based on initial quantization matrices.

DETAILED DESCRIPTION OF THE INVENTION

Figure 2:
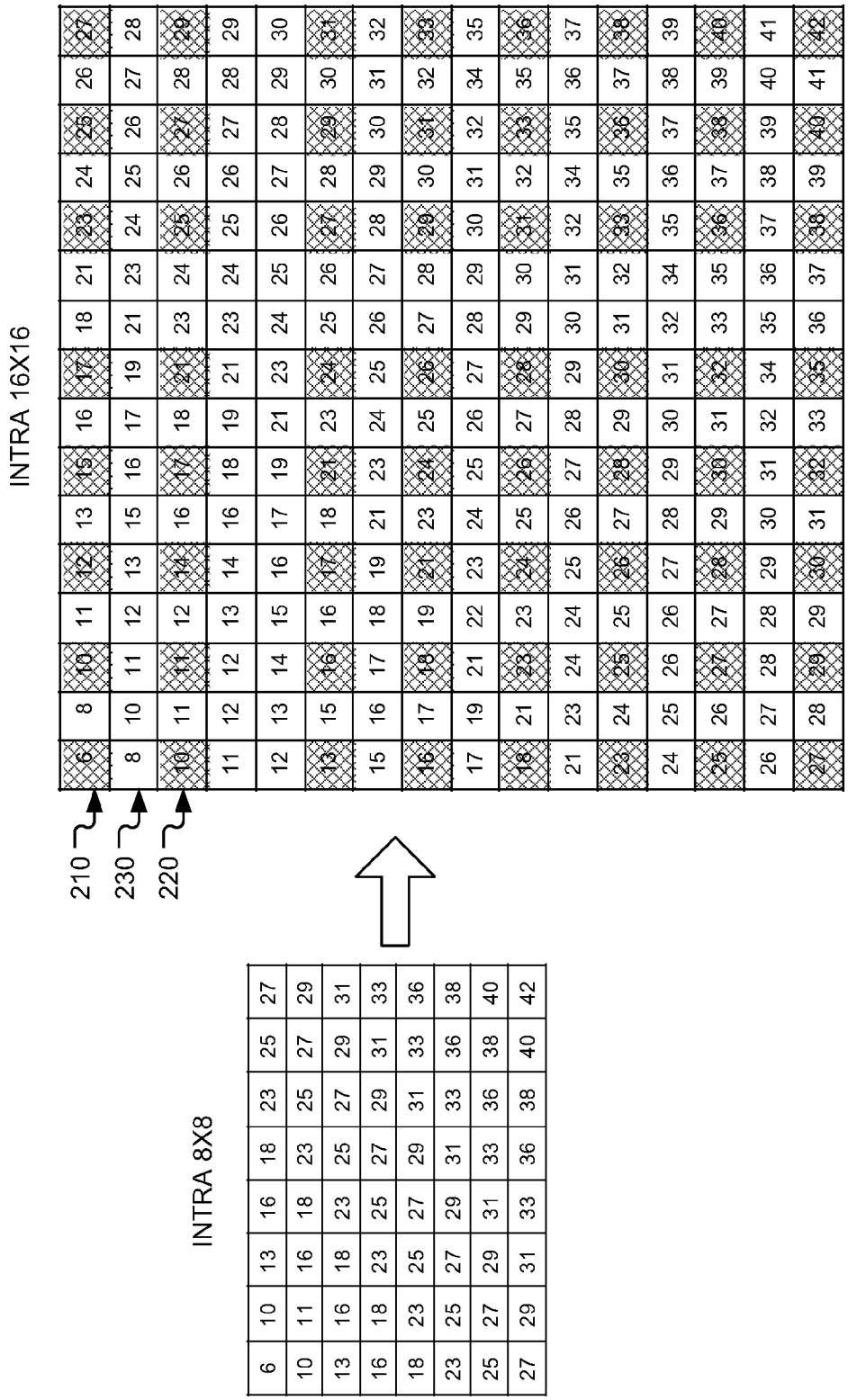
FIG. 2 illustrates an example of converting an 8×8 quantization matrix to a 16×16 quantization matrix by spatial frequency up-sampling and linear interpolation.

In order to overcome the increased data size of quantization matrices, embodiments according to the present invention receive one or more initial quantization matrices and derive one or more derived quantization matrices based on the initial quantization matrices. For example, an 8×8 default quantization matrix can be used as an initial quantization matrix. The initial 8×8 quantization matrix can be used to derive a 16×16 derived quantization matrix. The 16×16 derived quantization matrix can be further used to derive the 32×32 derived quantization matrix. When an initial quantization matrix is used to derive a larger derived quantization matrix, the derivation process comprises spatial-frequency up-sampling by mapping the initial quantization matrix into a larger mapped quantization matrix and interpolating the remaining entries of the mapped quantization matrix into a derived quantization matrix.

For example, the entries of the initial quantization matrix are mapped to the entries of the mapped quantization matrix having equivalent spatial frequencies. As an example, an initial 8×8 quantization matrix is used to derive a 16×16 quantization matrix. The mapped 16×16 quantization matrix can be generated according to $$C_{16 \times 16}[2i][2j] = C_{8 \times 8}[i][j] \text{ if } i \leq t \text{ and } j \leq t, \quad (1)$$

$$C_{16 \times 16}[2i][2j+1] = C_{8 \times 8}[i][j] \text{ if } i \leq t \text{ and } (j > t \text{ or } j = 7), \quad (2)$$

$$C_{16 \times 16}[2i+1][2j] = C_{8 \times 8}[i][j] \text{ if } (i > t \text{ or } i = 7) \text{ and } j \leq t, \quad (3)$$

$$C_{16 \times 16}[2i+1][2j+1] = C_{8 \times 8}[i][j] \text{ if } (i > t \text{ and } j > t) \text{ or } (i = j = 7), \quad (4)$$

where $0 \leq i, j \leq 7$ and t is a threshold having a value smaller than 7.

After the mapping, the remaining entries of the derived 16×16 quantization matrix can be generated by interpolation. For example, linear interpolation based on mapped entries of its immediate left and right neighbors, or immediate upper and lower neighbors as shown in equations (5) and (6) may be used.

$$C_{16 \times 16}[i+1][j] = (C_{16 \times 16}[i][j] + C_{16 \times 16}[i+2][j] + 1) >> 1 \quad (5)$$

$$C_{16 \times 16}[i][j+1] = (C_{16 \times 16}[i][j] + C_{16 \times 16}[i][j+2] + 1) >> 1 \quad (6)$$

For the entries of the derived 16×16 quantization matrix whose immediate left or right neighbor, or immediate upper or lower neighbor is not a mapped entry, the interpolation process is performed according to equations (7), (8), (9) and (10):

$$C_{16 \times 16}[i+1][j] = (C_{16 \times 16}[i][j] * 2 + C_{16 \times 16}[i+3][j]) / 3 \quad (7)$$

$$C_{16 \times 16}[i+2][j] = (C_{16 \times 16}[i][j] + C_{16 \times 16}[i+3][j] * 2) / 3 \quad (8)$$

$$C_{16 \times 16}[i][j+1] = (C_{16 \times 16}[i][j] * 2 + C_{16 \times 16}[i][j+3]) / 3 \quad (9)$$

$$C_{16 \times 16}[i][j+2] = (C_{16 \times 16}[i][j] + C_{16 \times 16}[i][j+3] * 2) / 3 \quad (10)$$

FIG. 2 illustrates an example according to the quantization matrix derivation process described above, where the threshold t is chosen to be 4. In this example, the Intra 8×8 quantization matrix is used as the initial quantization to derive a derived 16×16 quantization matrix for the Intra 16×16 mode. During the first step, the entries of the 8×8 quantization matrix are mapped to a mapped 16×16 quantization matrix with similar spatial frequencies. The mapped entries are indicated by shaded areas in FIG. 2. Accordingly, 64 mapped entries are determined for the 16×16 derived quantization matrix. The mapping process specified in equations (1)-(4) causes mapped entries configured in a way that any remaining entry is always between two existing mapped entries horizontally or vertically. In order to align the end-points of the smaller matrix and the larger matrix, the up-sampling intervals may not be the same. While maintaining the interval as uniform as possible, one of the intervals may have to be adjusted in order to align the end-points horizontally and vertically. The threshold t in equations (1)-(4) is used to determine the location for the adjusted interval. The type of mapping is called end-point aligned linear spatial-frequency up-sampling in this disclosure. The remaining entries, as indicated by the non-shaded areas, are then interpolated using at least two neighboring mapped entries.

After spatial-frequency up-sampling, the interpolation can be performed horizontally first and then vertically. For example, horizontal interpolation can be applied to the first row 210 and then the third row 220. After both row 210 and row 220 are interpolated, all entries in row 210 and row 220 are available by either mapping or interpolation. Row 230 can be generated by vertical interpolation based on either mapped neighbors or interpolated neighbors. Nevertheless, vertical interpolation based on mapped neighbors can be performed any time without waiting for horizontal interpolation. Furthermore, vertical interpolation for row 230 based on horizontally interpolated neighbors can start whenever the corresponding entries become available without waiting for completion of row 210 and row 220. Various processing order may also be used. For example, the vertical interpolation can be performed first followed by horizontal interpolation. While end-point aligned linear spatial-frequency up-sampling is disclosed above, regular spatial-frequency up-sampling may also be used, where equation (1) is applied to generate all up-sampled entries for the larger quantization matrix. In this case, remaining entries beyond the last up-sampled entries may have to be generated using extrapolation instead of interpolation.

Figure 3A:
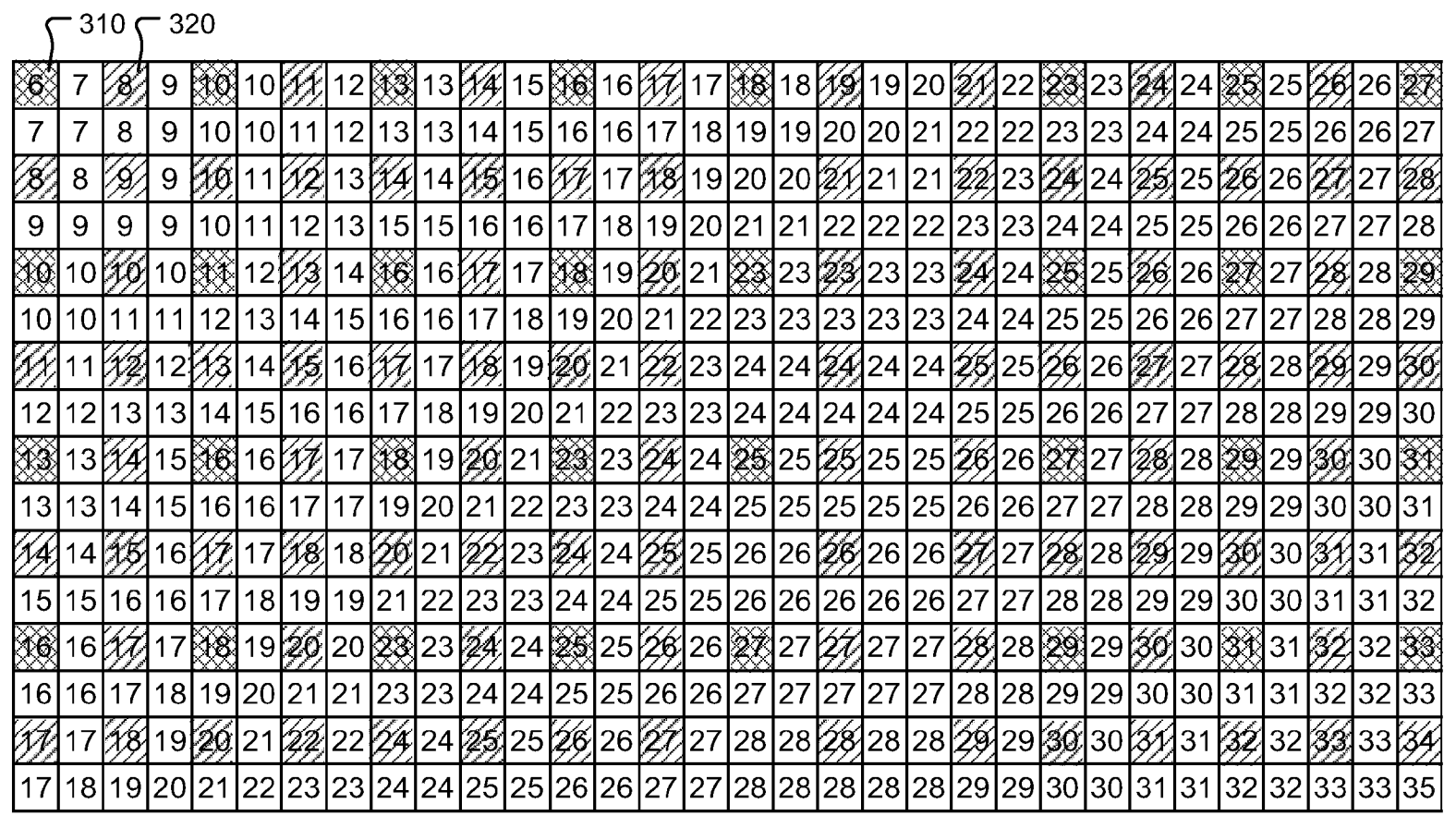
Figure 3B:
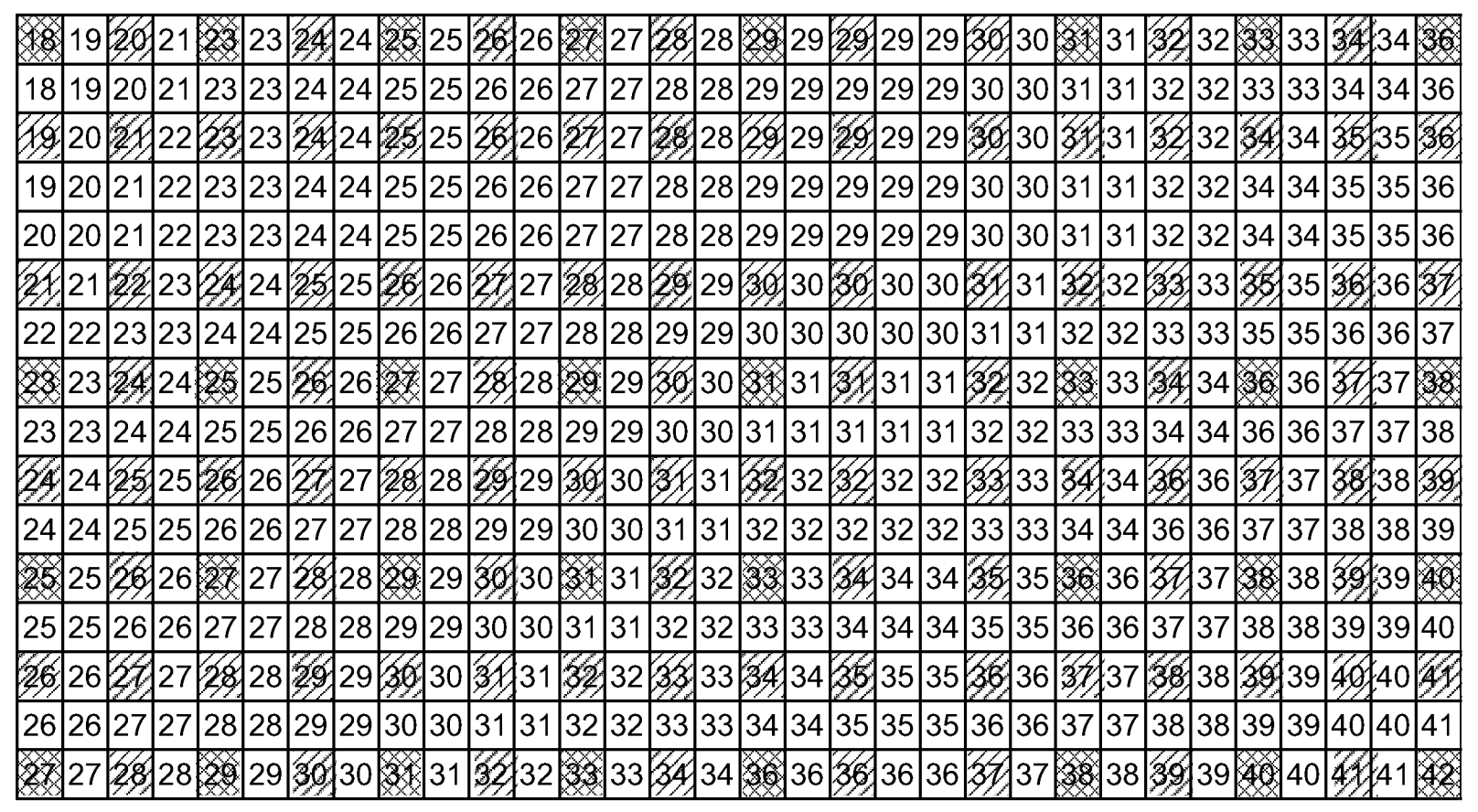

Similarly, the derivation of Inter 16×16 quantization matrix can be performed based on the Inter 8×8 quantization matrix. After the 16×16 derived quantization matrix is obtained, the 16×16 derived quantization matrix can be used to generate the 32×32 derived quantization matrix using similar process. The 32×32 derived quantization matrix is shown in FIGS. 3A and 3B with threshold, t=9, where the upper part of the 32×32 derived quantization matrix is shown in FIG. 3A and the lower part of the 32×32 derived quantization matrix is shown in FIG. 3B. In FIGS. 3A and 3B, the shaded areas indicate the mapped entries from the 16×16 derived quantization matrix, where the cross-line shaded areas 310 indicate the entries originally from the 8×8 quantization matrix and the slant-line shaded areas 320 indicate the derived entries of the 16×16 quantization matrix.

In another embodiment of the present invention, a square quantization matrix is used as an initial quantization matrix to generate entries of a non-square quantization matrix. Furthermore, the square quantization matrix used as the initial quantization matrix may have been derived from an initial quantization matrix having a smaller size. For example, 4×16 and 16×4 quantization matrices can be derived from a 16×16 quantization matrix, where the 16×16 quantization matrix may have been derived from an original 8×8 quantization matrix. Similarly, 8×32, 32×8 quantization matrices can be derived from a 32×32 quantization matrix. The 32×32 quantization matrix may have been derived from a 16×16 quantization matrix.

Figure 4A:
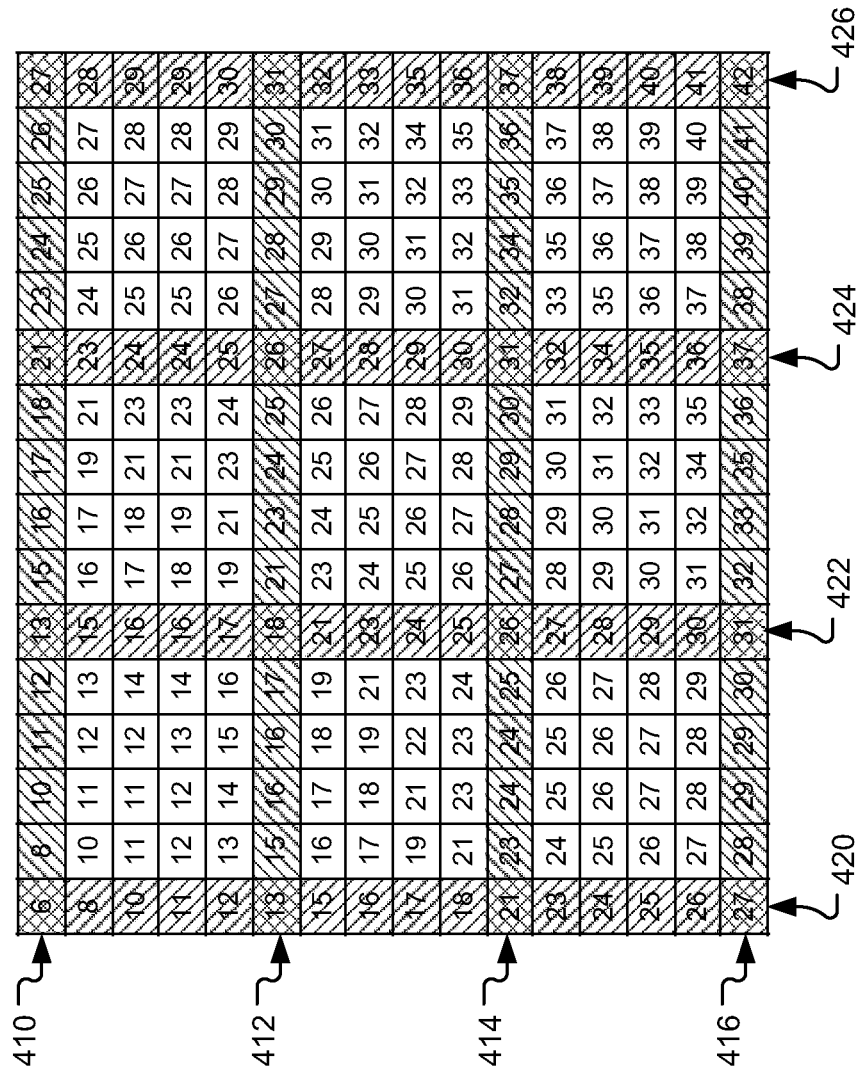

FIG. 4A illustrates an example of an initial 16×16 quantization matrix that is derived from an initial 8×8 quantization matrix, where the initial 8×8 quantization matrix is shown in FIG. 2. Nevertheless, other 16×16 quantization matrix may also be used to derive non-square quantization matrices. In order to generate 16×4 quantization matrix, 4 rows can be selected to span the vertical range. For example, the $0^{th}$ (the index starting with 0), $5^{th}$, $10^{th}$, and $15^{th}$ rows can be selected to form the 16×4 quantization matrix as indicated by the shaded rows 410-416 in FIG. 4A. Similarly, the $0^{th}$, $5^{th}$, $10^{th}$, and $15^{th}$ columns can be selected to form the 4×16 quantization matrix as indicated by the shaded rows 420-426 in FIG. 4A. The derived 16×4 quantization matrix and the 4×16 quantization matrix are shown in FIG. 4B and FIG. 4C respectively. Since the location of an entry in the quantization matrix is associated with a spatial frequency, the subsampling process as shown in FIG. 4A is equivalent to frequency decimation (4:1 decimation in this case). The particular rows or columns used to derive the 16×4 and 4×16 quantization matrices are for illustration purpose. A skilled person in the art may select other rows or columns to derive the 16×4 and 4×16 quantization matrices. For example, the $0^{th}$, $4^{th}$, $8^{th}$, and $12^{th}$ rows/columns or the $3^{rd}$, $7^{th}$, $11^{th}$, and $15^{th}$ rows/columns can also be selected The 32×8 quantization matrix can be derived from the $0^{th}$, $4^{th}$, $8^{th}$, $12^{th}$, $16^{th}$, $21^{st}$, $26^{th}$ and $31^{st}$ rows of a 32×32 quantization matrix and the 8×32 quantization matrix can be derived from the $0^{th}$, $4^{th}$, $8^{th}$, $12^{th}$, $16^{th}$, $23^{rd}$, $27^{th}$ and $31^{st}$ columns of the corresponding 32×32 matrix. Again, the particular rows or columns used to derive the 32×8 and 8×32 quantization matrices are for illustration purpose. FIG. 5 illustrates an example of 32×8 quantization matrix derived from the $0^{th}$, $4^{th}$, $8^{th}$, $12^{th}$, $16^{th}$, $21^{st}$, $26^{th}$ and $31^{st}$ rows of a 32×32 quantization matrix, where the 32×32 quantization matrix is shown in FIGS. 3A and 3B. A skilled person in the art may select other rows or columns to derive the 32×8 and 8×32 quantization matrices.

Figure 6:
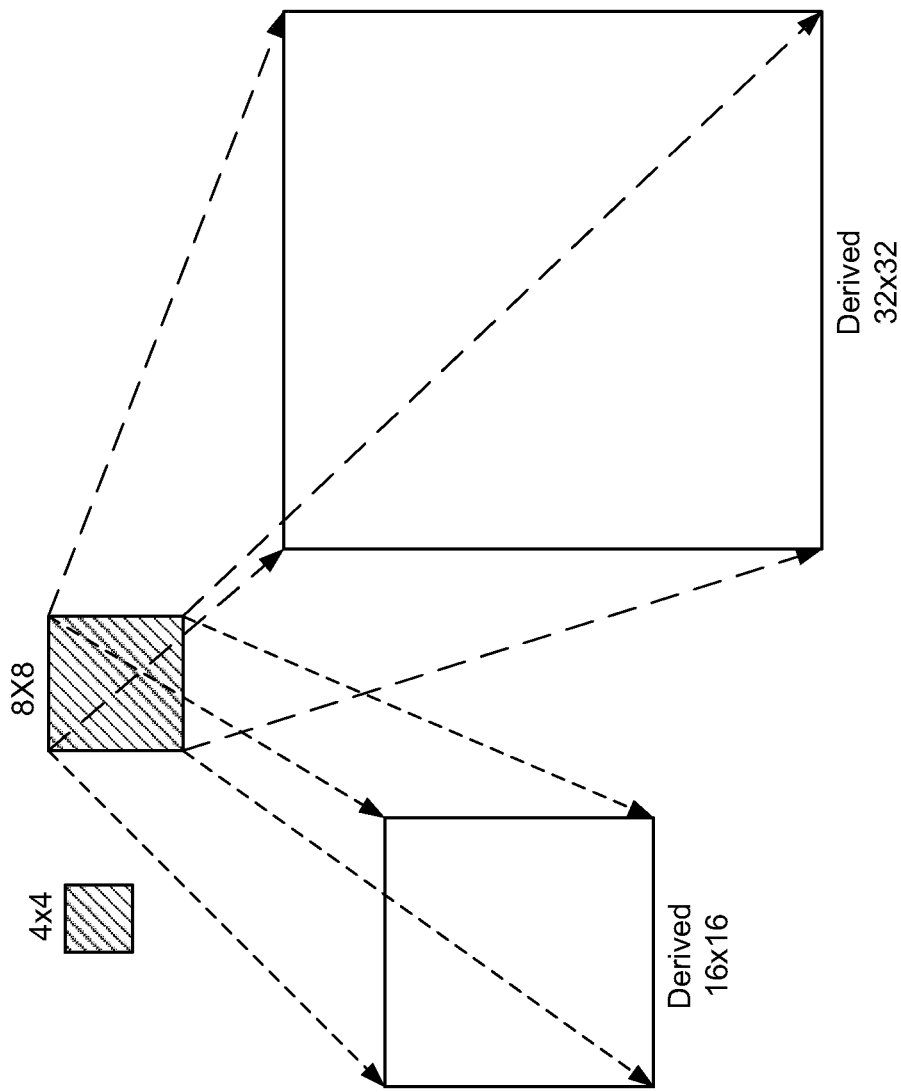
FIG. 6 illustrates an example of quantization matrix representation based on a 4×4 quantization matrix and an 8×8 quantization matrix, where the 8×8 quantization matrix is used to derive the 16×16 and 32×32 quantization matrices.

In yet another embodiment of the present invention, larger quantization matrices are derived from a smaller quantization matrix. For example, a coding system using 4×4, 8×8, 16×16 and 32×32 quantization matrices may derive the 16×16 and 32×32 quantization matrices from the 8×8 quantization matrix, Therefore, the system only need to store or transmit the 4×4 and 8×8 quantization matrices as shown in FIG. 6. If default 4×4 and 8×8 quantization matrices are used, the quantization matrices can be hardcoded in memory or storage such as ROM/PROM and other logic circuits due to the small size.

Figure 7:
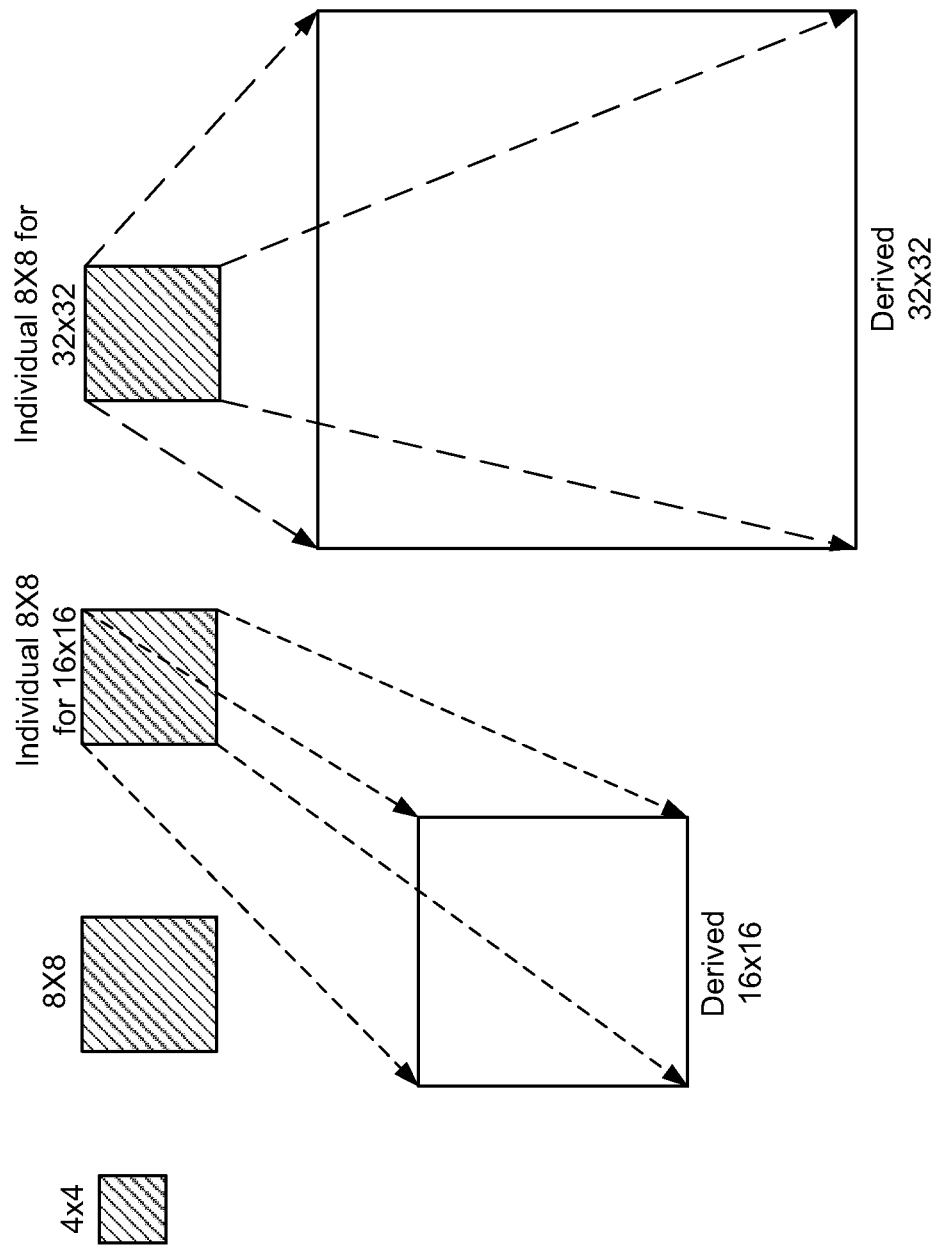
FIG. 7 illustrates an example of quantization matrix representation based on one 4×4 quantization matrix and three 8×8 quantization matrices, where 16×16 and 32×32 quantization matrices are derived from respective 8×8 matrices.

The default 8×8 quantization matrix is usually designed to optimize the performance for 8×8 transform blocks. Therefore the derived 16×16 or 32×32 quantization matrix based on an initial 8×8 quantization matrix designed for 8×8 transform blocks may not perform as good as the 16×16 or 32×32 quantization matrix designed for 16×16 or 32×32 transform blocks. Accordingly, another embodiment of the present invention utilizes an individual 8×8 quantization matrix for derivation of 16×16 quantization matrix. It further uses another individual 8×8 quantization matrix for derivation of 32×32 quantization matrix to improve the performance. The individual 8×8 quantization matrices used to derive the 16×16 and 32×32 quantization matrices can be derived by down-sampling original 16×16 and 32×32 quantization matrices designed for 16×16 or 32×32 transform blocks respectively. The quantization matrix representation is shown in FIG. 7, where one initial quantization matrix has a size of 4×4 and three initial quantization matrices have a size of 8×8. The 16×16 and 32×32 quantization matrices are derived from respective 8×8 quantization matrices. Compared with the quantization matrix representation in FIG. 6, the quantization matrix representation in FIG. 7 requires additional storage for two 8×8 quantization matrices.

In FIG. 6 and FIG. 7, the initial 4×4 and 8×8 quantization matrices may be default quantization matrices or user-defined quantization matrices. In the case that the 16×16 and 32×32 quantization matrices are derived based on individual 8×8 quantization matrices, the individual 8×8 quantization matrices can be derived by down-sampling default or user-defined 16×16 and 32×32 quantization matrices respectively.

There are various ways to generate a smaller quantization matrix by down-sampling a larger quantization matrix. These methods can be classified into two types, one is to down sample evenly over the larger quantization matrix and the other is to down sample densely in the low frequency region. As an example, a 16×16 or 32×32 quantization matrix can be down sampled uniformly to generate an 8×8 quantization matrix according to $$C_{8\times8}[i][j]=C_{16\times16}[i<<1][j<<1], i=0,\ldots,7; j=0,\ldots,7, \quad (11)$$

$$C_{8\times8}[i][j]=C_{32\times32}[i<<2][j<<2], i=0,\ldots,7; j=0,\ldots,7. \quad (12)$$

As mentioned before, the location of an entry in the quantization matrix is associated with a spatial frequency, the subsampling process as shown in equations (11) and (12) is equivalent to frequency decimation (2:1 and 4:1 decimation in this case). The down-sampling pattern may also contain a spatial offset. For example, the down-sampling pattern may be shifted one position to the right and one position down, i.e., $C_{8\times8}[0][0]=C_{16\times16}[1][1]$. Embodiments of the present invention also include end-point aligned linear down-sampling, which corresponds to the inverse process of the end-point aligned linear spatial-frequency up-sampling as shown in FIG. 2. Similarly, the individual 8×8 quantization matrix for the 32×32 quantization matrix can be derived using end-point aligned linear spatial-frequency up-sampling.

As another example, the low frequency entries of 16×16 or 32×32 quantization matrix can be mapped to an 8×8 quantization matrix of the two quantization matrices according to $$C_{8\times8}[i][j]=C_{16\times16}[i][j], i=0,\ldots,7; j=0,\ldots,7, \quad (13)$$

$$C_{8\times8}[i][j]=C_{32\times32}[i][j], i=0,\ldots,7; j=0,\ldots,7. \quad (14)$$

In the above example, the lowest-frequency entry of two corresponding quantization matrices are aligned, i.e., $C_{8\times8}[0][0]=C_{16\times16}[0][0]$ and $C_{8\times8}[0][0]=C_{32\times32}[0][0]$.

Linear interpolation can be used to generate a larger quantization matrix from a smaller quantization matrix. If the smaller quantization matrix was generated by uniform down sampling from an original larger quantization matrix, linear interpolation may take into account the down-sampling pattern. For example, the 16×16 derived quantization matrix can be interpolated from the 8×8 quantization matrix, as follows:

$$C_{2N\times2N}[2i][2j]=C_{N\times N}[i][j], i=0,\ldots,N-1; j=0,\ldots,N-1, \quad (15)$$

$$C_{2N\times2N}[2i][2j+1]=(C_{N\times N}[i][j]+C_{N\times N}[i][j+1])>>1, i=0,\ldots,N-1; j=0,\ldots,N-2, \quad (16)$$

$$C_{2N\times2N}[2i+1][2j]=(C_{N\times N}[i][j]+C_{N\times N}[i+1][j])>>1, i=0,\ldots,N-2; j=0,\ldots,N-1, \quad (17)$$

$$C_{2N\times2N}[2i+1][2j+1]=(C_{N\times N}[i][j]+C_{N\times N}[i][j+1]+C_{N\times N}[i+1][j]+C_{N\times N}[i+1][j+1])>>2, i=0,\ldots,N-2; j=0,\ldots,N-2, \quad (18)$$

$$C_{2N\times2N}[i][2N-1]=C_{2N\times2N}[i][2N-2], i=0,\ldots,2N-2, \quad (19)$$

$$C_{2N\times2N}[2N-1][j]=C_{2N\times2N}[2N-2][j], j=0,\ldots,2N-1, \quad (20)$$

where N=8.

In equation (15), the entries of the 8×8 quantization matrix are mapped to a mapped 16×16 quantization matrix with similar spatial frequencies using linear spatial-frequency up-sampling. Vertical interpolation is performed in equation (16) followed by horizontal interpolation in equation (17) to generate data between two mapped neighbors in the vertical and horizontal directions respectively. Equation (18) is used to generate data among four mapped neighbors using two-dimensional interpolation. Equations (19)-(20) generate data for entries beyond the last mapped entries using extrapolation in the vertical and horizontal directions respectively, where sample repetition is used as a means for data extrapolation in this example. Equations (13)-(20) illustrate an example of linear interpolation/extrapolation from an 8×8 matrix to a 16×16 matrix. Nevertheless, other interpolation method, such as the example described in equations (1)-(10), may also be used. Other processing order in the vertical and horizontal directions may be used as well. After the 16×16 quantization matrix is derived, the 32×32 quantization matrix can be interpolated/extrapolated from the derived 16×16 quantization matrix by sample repetition, $$C'_{2N\times2N}[2i][2j]=C'_{N\times N}[i][j], i=0,\ldots,N-1; j=0,\ldots,N-1, \quad (21)$$

$$C'_{2N\times2N}[2i][2j+1]=C'_{N\times N}[i][j], i=0,\ldots,N-1; j=0,\ldots,N-1, \quad (22)$$

$$C'_{2N\times2N}[2i+1][2j]=C'_{N\times N}[i][j], i=0,\ldots,N-1; j=0,\ldots,N-1, \quad (23)$$

$$C'_{2N\times2N}[2i+1][2j+1]=C'_{N\times N}[i][j], i=0,\ldots,N-1; j=0,\ldots,N-1. \quad (24)$$

where $C'_{N\times N}$ represents the 16×16 quantization matrix, $C'_{2N\times2N}$ represents the 32×32 quantization matrix and N=16. While sample repetition is used to interpolate/extrapolate the 16×16 quantization matrix to the 32×32 quantization matrix, other types of interpolation/extrapolation may also be used to practice embodiments of the present invention. The method, as shown in equations (15)-(24), derives the 16×16 quantization matrix from the 8×8 quantization matrix using linear interpolation. After the 16×16 quantization matrix is derived, sample repetition technique is used to derive the 32×32 quantization matrix based on the derived 16×16 quantization matrix. An alternative method for deriving the 16×16 and 32×32 quantization matrices from the 8×8 quantization matrix may be purely based on sample repetition according to $$C_{16\times16}[i][j]=C_{8\times8}[i>>1][j>>1], i=0,\ldots,15; j=0,\ldots,15, \quad (25)$$

$$C_{32\times32}[i][j]=C_{8\times8}[i>>2][j>>2], i=0,\ldots,31; j=0,\ldots,31. \quad (26)$$

If the smaller quantization matrix was down-converted by mapping entries corresponding to low frequencies of a larger quantization matrix to the smaller quantization matrix, a corresponding up-conversion method can be used to derive the larger quantization matrix based on the smaller quantization matrix. For example, the 16×16 derived quantization matrix can be up-converted using interpolated/extrapolated from the 8×8 quantization matrix, as follows:

$$C_{16\times16}[i][j]=C_{8\times8}[i][j], \text{ if } i<8; j<8, \quad (27)$$

$$C_{16\times16}[i][j]=C_{16\times16}[i-1][j]+1, \text{ if } i\geq8; j<8, \quad (28)$$

$$C_{16\times16}[i][j]=C_{16\times16}[i][j-1]+1, \text{ Otherwise}. \quad (29)$$

The 32×32 derived quantization matrix can be up-converted using interpolated/extrapolation from the 8×8 quantization matrix, as follows:

$$C_{32\times32}[i][j]=C_{8\times8}[i][j], \text{ if } i<8; j<8, \quad (30)$$

$$C_{32\times32}[i][j]=C_{8\times8}[7][j]+((i-7)>>1), \text{ if } i\geq8; j<8, \quad (31)$$

$$C_{32\times32}[i][j]=C_{8\times8}[i][7]+((j-7)>>1), \text{ Otherwise}. \quad (32)$$

The derivation of larger quantization matrices as shown in equations (27)-(32) comprises two parts. The first part is to map the smaller quantization matrix to the low-frequency entries of the larger quantization matrices as shown in equations (27) and (30). The second part is to extrapolate data for the remaining entries of the larger quantization matrices. While the above examples perform extrapolation in the horizontal direction first and then vertical direction, it may also perform the extrapolation in the vertical direction first and then the horizontal direction. Furthermore, while one-dimensional extrapolation is shown, a person skilled in the art may also use two-dimensional interpolation/extrapolation to generate data for the remaining entries after the first part is performed.

In order to enable a coding system to use the quantization matrix representation as described above, a set of syntax has to be designed. The set of syntax can be added in SPS (Sequence Parameter Set RBSP Syntax), PPS (Picture Parameter Set RBSP Syntax) or APS (Adaptation Parameter Set RBSP Syntax) to convey information associated with the quantization matrices to the decoder.

In the sequence level of HEVC, seq_quant_matrix_present_flag can be used in SPS to indicate whether the whole sequence will use the quantization matrices or not. If it is true, seq_quant_matrix_present_idx is checked for each transform size and each color or channel (e.g., Y,U,V) to determine whether the specified transform size and each channel will use the quantization matrices or not. If it is true and the transform size is 4×4 or 8×8, user-defined quantization matrices are incorporated. Entropy coding may be used for reducing the required data rate associated with the user-defined quantization matrices. Otherwise, implicit_quant_matrix_present_idx is checked to determine whether the rectangle quantization matrices and the bigger quantization matrices are derived from the 4×4 and 8×8 quantization matrices. If implicit_quant_matrix_present_idx is not true, the user-defined quantization matrices are incorporated in the video bitstream. The user-defined quantization matrices may be entropy coded. An exemplary syntax design for SPS to enable quantization matrix representation according to the present invention is shown in FIG. 8.

In the picture level of HEVC, pic_quant_matrix_present_flag can be used in PPS to indicate whether the current picture will use the quantization matrices or not. The following exemplary syntax can be incorporated in PPS (Picture Parameter Set) as shown in FIG. 9 or APS (Adaptation Parameter Set) as shown in FIG. 10. If "pic_quant_matrix_present_flag" is true, "scaling_list_param( )" function is called. An exemplary implementation of the "scaling_list_param( )" function is shown in FIG. 11. For the rectangle and larger quantization matrices, they are derived when the corresponding initial quantization matrices are decoded. One example embodiment of the derivation is shown in FIG. 12. The syntax design as shown in FIG. 9 through FIG. 12 is intended as an illustration to facilitate an embodiment of the present invention. A skilled person in the art may use other syntax design to practice the present invention without departing from the spirit of the present invention.

When user-defined quantization matrices are used, embodiments according to the present invention can reduce the transmitted information associated with the larger quantization matrices. Therefore, more bandwidth becomes available to the video data to achieve better system performance. For comparison, a coding system based on HEVC Test Model Version 4.0 (HEVC-4.0) is used, where 4×4, 8×8, 16×4, 4×16, 16×16, 32×8, 8×32, 32×32 block sized are used. In a conventional approach, user-defined quantization matrices for all block sizes are transmitted in the bit stream. On the other hand, according to one embodiment of the present invention, only 4×4 and 8×8 user-defined quantization matrices are incorporated in the bitstream. Other quantization matrices are derived from the 4×4 and 8×8 quantization matrices transmitted. The bit rate saved from transmitting the quantization matrices can be used for the underlying video data. Therefore, improved performance can be achieved. The performance is measured in terms of BD rate, where a negative value implies performance improvement and the BD rate improvement is obtained compared to the conventional system with no subjective quality degradation.

Table 3 illustrates the comparison for High Efficiency (HE) coding configuration and Low Complexity (LC) coding configuration. In both cases, improvement more than 10% has been achieved. Table 4 illustrates the comparison for Random Access HE coding configuration and Random Access LC coding configuration. The improvement is around 40% in both cases. Table 5 illustrates the comparison for Low Delay HE coding configuration and for Low Delay LC coding configuration for B frames. The improvement is more than 50% in both cases. Table 6 illustrates the comparison for Low Delay HE coding configuration and for Low Delay LC coding configuration for P frames. The improvement is more than 50% in both cases.

TABLE 3

|  | All Intra HE | | | All Intra LC | | |
| --- | --- | --- | --- | --- | --- | --- |
|  | Y | U | V | Y | U | V |
| Class A | −5.6% | −2.1% | −1.0% | −6.2% | −0.1% | 1.0% |
| Class B | −6.7% | −6.0% | −6.0% | −6.7% | −5.4% | −5.4% |
| Class C | −15.0% | −13.9% | −14.0% | −14.0% | −13.0% | −13.1% |
| Class D | −32.4% | −30.4% | −30.7% | −31.0% | −29.2% | −29.4% |
| Class E | −17.8% | −16.4% | −16.1% | −16.4% | −14.8% | −14.7% |
| Overall | −14.9% | −13.3% | −13.1% | −14.4% | −12.0% | −11.9% |
| Enc Time [%] | 99% | | | 99% | | |
| Dec Time [%] | 98% | | | 98% | | |

TABLE 4

|  | Random Access HE | | | Random Access LC | | |
| --- | --- | --- | --- | --- | --- | --- |
|  | Y | U | V | Y | U | V |
| Class A | −21.0% | −17.3% | −14.7% | −19.9% | −15.0% | −12.2% |
| Class B | −35.0% | −32.1% | −30.8% | −33.4% | −30.3% | −29.1% |
| Class C | −52.3% | −50.2% | −50.2% | −51.2% | −49.1% | −49.1% |
| Class D | −72.6% | −71.1% | −71.2% | −71.9% | −70.6% | −70.8% |
| Overall | −44.6% | −42.0% | −41.1% | −43.5% | −40.6% | −39.6% |
| Enc Time [%] | 100% | | | 100% | | |
| Dec Time [%] | 98% | | | 99% | | |

TABLE 5

|  | Low delay B HE | | | Low delay B LC | | |
| --- | --- | --- | --- | --- | --- | --- |
|  | Y | U | V | Y | U | V |
| Class B | −37.1% | −33.0% | −31.9% | −35.7% | −31.5% | −30.0% |
| Class C | −52.5% | −50.0% | −49.8% | −51.4% | −48.9% | −49.0% |
| Class D | −72.2% | −70.4% | −70.6% | −71.7% | −69.9% | −70.2% |
| Class E | −75.6% | −73.6% | −73.4% | −74.3% | −72.0% | −72.4% |
| Overall | −57.0% | −54.2% | −53.9% | −55.9% | −53.1% | −52.8% |
| Enc Time [%] | 100% | | | 100% | | |
| Dec Time [%] | 98% | | | 99% | | |

TABLE 6

|  | Low delay P HE | | | Low delay P LC | | |
| --- | --- | --- | --- | --- | --- | --- |
|  | Y | U | V | Y | U | V |
| Class B | −36.2% | −32.3% | −31.1% | −34.5% | −30.4% | −29.0% |
| Class C | −51.8% | −49.1% | −48.9% | −50.7% | −48.1% | −48.2% |
| Class D | −71.7% | −69.7% | −69.9% | −71.2% | −69.2% | −69.7% |
| Class E | −75.0% | −72.9% | −72.8% | −73.6% | −71.3% | −71.8% |
| Overall | −56.2% | −53.5% | −53.1% | −55.0% | −52.2% | −52.0% |
| Enc Time [%] | 100% | | | 100% | | |
| Dec Time [%] | 98% | | | 99% | | |

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software code, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for processing transform blocks according to quantization matrices in a video coding system, the method comprising:
    receiving, via a receiving circuit, one or more initial quantization matrices having first sizes;
    deriving, using a circuit, one or more derived quantization matrices having second sizes from one of said one or more initial quantization matrices, wherein the second size is different than the first size;
    receiving, via a receiving circuit, a transform block having a block size, where the transform block is associated with a picture, and wherein the block size is equal to one of the first sizes or one of the second sizes;
    processing, using a processing circuit, the transform block according to respective one of said one or more initial quantization matrices if the block size is equal to said one of the first sizes; and
    processing, using a processing circuit, the transform block according to respective one of said one or more derived quantization matrices if the block size is equal to said one of the second sizes;
    wherein said one or more initial quantization matrices comprise one or more square initial quantization matrices, wherein said one or more derived quantization matrices comprise one or more non-square, rectangular transform block sizes.

2. The method of claim 1, wherein said one or more initial quantization matrices comprise a 4×4 quantization matrix and an 8×8 quantization matrix, wherein the 4×4 quantization matrix and the 8×8 quantization matrix are default quantization matrices, and wherein said one or more derived quantization matrices correspond to transform block sizes larger than 8×8.

3. The method of claim 1, wherein said one or more initial quantization matrices comprise a 4×4 quantization matrix and an 8×8 quantization matrix, wherein the 4×4 quantization matrix and the 8×8 quantization matrix are user-defined quantization matrices, and wherein said one or more derived quantization matrices correspond to transform block sizes larger than 8×8.

4. The method of claim 1, wherein said one or more square initial quantization matrices are default quantization matrices or user-defined quantization matrices.

5. The method of claim 1, wherein a flag is incorporated in a sequence level to indicate whether default quantization matrices are used for a respective sequence.

6. The method of claim 1, wherein a flag is incorporated in a picture level to indicate whether sequence-level quantization matrices are used for a current picture.

7. The method of claim 1, wherein a flag is incorporated in an adaptation level to indicate whether sequence-level quantization matrices are used for a current picture.

8. The method of claim 1, wherein a flag is incorporated in a picture level to indicate whether sequence-level quantization matrices are derived from said one or more initial quantization matrices, and wherein said one or more initial quantization matrices comprise a 4×4 quantization matrix and an 8×8 quantization matrix.

9. The method of claim 1, wherein a flag is incorporated in an adaptation level to indicate whether sequence-level quantization matrices are derived from said one or more initial quantization matrices, and wherein said one or more initial quantization matrices comprise a 4×4 quantization matrix and an 8×8 quantization matrix.

10. The method of claim 1, wherein said one or more initial quantization matrices comprise a 4×4 quantization matrix and a 8×8 quantization matrix, and wherein said one or more derived quantization matrices comprise a 16×16 quantization matrix and a 32×32 quantization matrix.

11. The method of claim 1, wherein said one or more derived quantization matrices comprise 16×4, 4×16, 32×8, and 8×32 quantization matrices.

12. The method of claim 1, wherein syntax information is incorporated in a video bitstream to indicate that said second sizes include all rectangular sizes associated with the block size.

13. The method of claim 1, wherein syntax information is incorporated in a video bitstream to indicate that said second sizes include all sizes associated with the block size larger than 8×8.

14. The method of claim 1, wherein said deriving one or more derived quantization matrices converts one square initial quantization matrix to one square derived quantization matrix by either spatial frequency up-sampling and linear interpolation/extrapolation, or spatial frequency up-sampling and sample repetition, and wherein said one square initial quantization matrix is smaller than said one square derived quantization matrix.

15. The method of claim 14, wherein the spatial frequency up-sampling comprises end-point aligned spatial frequency up-sampling.

16. The method of claim 1, wherein said deriving one or more derived quantization matrices maps one square initial quantization matrix to low-frequency entries of one square derived quantization matrix by aligning an entry corresponding to a lowest spatial frequency of said one square initial quantization matrix and said one square derived quantization matrix, said deriving one or more derived quantization matrices generates remaining entries of said one square derived quantization matrix using data extrapolation, and wherein said one square initial quantization matrix is smaller than said one square derived quantization matrix.

17. The method of claim 1, wherein said one or more derived rectangular quantization matrices are derived from respective square derived quantization matrix using spatial frequency decimation.

18. The method of claim 1, wherein said one or more initial quantization matrices comprise a first 8×8 square initial quantization matrix and a second 8×8 square initial quantization matrix, wherein the first 8×8 square initial quantization matrix is converted from a 16×16 square initial quantization matrix, and wherein the second 8×8 square initial quantization matrix is converted from a 32×32 square initial quantization matrix.

19. The method of claim 1, wherein said one or more square initial quantization matrices are converted from said respective one or more larger square initial quantization matrices based on spatial frequency decimation.

20. The method of claim 1, wherein said one or more square initial quantization matrices are converted from said respective one or more larger square initial quantization matrices based on mapping low-frequency entries of said respective one or more larger square initial quantization matrices to said one or more square initial quantization matrices with an entry corresponding to a lowest spatial frequency of said one or more square initial quantization matrices and said respective one or more larger square initial quantization matrices aligned.

21. A video coding system, wherein transform blocks are processed according to quantization matrices, the system comprising:
a first electronic circuit configured to receive one or more initial quantization matrices having first sizes;
means deriving circuit for deriving one or more derived quantization matrices having second sizes from one of said one or more initial quantization matrices;
receiving circuit for receiving receive a transform block having a block size, wherein the block size is equal to one of the first sizes or one of the second sizes;
processing circuit for processing the transform block according to respective one of said one or more initial quantization matrices if the block size is equal to said one of the first sizes; and
second processing circuit for processing the transform block according to a respective one of said one or more derived quantization matrices if the block size is equal to said one of the second sizes; wherein said one or more initial quantization matrices comprise one or more square initial quantization matrices, wherein said one or more derived quantization matrices comprise one or more non-square, rectangular transform block sizes.

22. The system of claim 21 further comprising a second electronic circuit, wherein said one or more initial quantization matrices comprise one or more square initial quantization matrices, and wherein said one or more square initial quantization matrices are hardwired in the second electronic circuit.

23. A method for processing transform blocks according to quantization matrices in a video coding system, the method comprising:
receiving, via a receiving circuit, an initial quantization matrix having a first size;
deriving, using a circuit, a derived quantization matrix having a second size from the initial quantization matrix, wherein the second size is different than the first size;
receiving, via a receiving circuit, a transform block having a block size, where the transform block is associated with a picture, and wherein the block size is equal to the first size or the second size;
processing, using a processing circuit, the transform block according to the initial quantization matrix if the block size is equal to the first size; and
processing, using a processing circuit, the transform block according to the derived quantization matrix if the block size is equal to the second size;
wherein entries of the initial quantization matrix are mapped to entries of the derived quantization matrix having equivalent spatial frequencies, and remaining entries of the derived quantization matrix are interpolated by sample repetition.

24. The method of claim 23, wherein the initial quantization matrix comprises an 8×8 quantization matrix and the derived quantization matrix comprises a 16×16 quantization matrix, wherein the derived 16×16 quantization matrix $C_{16 \times 16}$ is derived from the initial 8×8 quantization matrix $C_{8 \times 8}$ based on sample repetition according to: $C_{16 \times 16}[i][j]=C_{8 \times 8}[i>>1][j>>1]$, where i=0, . . . , 15; j=0, . . . , 15.

25. The method of claim 23, wherein the initial quantization matrix comprises an 8×8 quantization matrix and the derived quantization matrix comprises a 32×32 quantization matrix, wherein the derived 32×32 quantization matrix $C_{32 \times 32}$ is derived from the initial 8×8 quantization matrix $C_{8\times8}$ based on sample repetition according to: $C_{32\times32}[i][j]=C_{8\times8}[i>>2][j>>2]$, where i=0,..., 31; j=0,..., 31.

26. The method of claim 23, wherein a flag is incorporated in a sequence level to indicate whether a default quantization matrix is used as the initial quantization matrix for a respective sequence.

27. The method of claim 23, wherein a flag is incorporated in a picture level to indicate whether a sequence-level quantization matrix is used for a current picture.

28. The method of claim 23, wherein a flag is incorporated in an adaptation level to indicate whether a sequence-level quantization matrix is used for a current picture.

29. The method of claim 1, wherein a flag is incorporated in a picture level to indicate whether a sequence-level quantization matrix is derived from the initial quantization matrix, and wherein the initial quantization matrix comprises a 4×4 quantization matrix or an 8×8 quantization matrix.

30. A video coding system, wherein transform blocks are processed according to quantization matrices, the system comprising:

a first electronic circuit configured to receive an initial quantization matrix having a first size;

means deriving circuit for deriving a derived quantization matrix having a second size from the initial quantization matrix;

receiving circuit for receiving receive a transform block having a block size, wherein the block size is equal to the first size or the second size;

processing circuit for processing the transform block according to the initial quantization matrix if the block size is equal to the first size; and second processing circuit for processing the transform block according to the derived quantization matrix if the block size is equal to the second size; wherein entries of the initial quantization matrix are mapped to entries of the derived quantization matrix having equivalent spatial frequencies, and remaining entries of the derived quantization matrix are interpolated by sample repetition.

* * * * *